United States Patent Office 3,639,599
Patented Feb. 1, 1972

3,639,599
UTEROTROPIC COMPOSITION
Werner Mehrhof, Klaus Irmscher, Giorgio Hecht-Lucari, Hans-Gunther Kraft, and Hartmut Kieser, Darmstadt, Germany, assignors to Merck Patent Gesellschaft mit beschrankter Haftung, Darmstadt, Germany
No Drawing. Continuation-in-part of application Ser. No. 766,316, Oct. 9, 1968. This application Apr. 20, 1970, Ser. No. 30,222
Claims priority, application Germany, Oct. 19, 1967, P 16 17 645.8
Int. Cl. A61k 17/06
U.S. Cl. 424—239
16 Claims

ABSTRACT OF THE DISCLOSURE

A combination of salts of:
(a) estrone sulfate, and
(b) estradiol-3-sulfate
yields a synergistic uterotropic effect much higher than that of estrone and is indicated for climacteric discomforts and the like.

CROSS REFERENCE TO RELATED APPLICATION

This application is a continuation-in-part of copending allowed application Ser. No. 766,316, filed Oct. 9, 1968.

This invention relates to a novel pharmaceutical combination of steroids of the female sex hormone type, said combination being particularly beneficial for the treatment of climacteric complaints.

Objects of this invention thus include the provision of novel compositions and methods of treatment based thereon.

Upon further study of the specification and claims, other objects and advantages of the present invention will become apparent.

To attain these objects, it has been found that a preparation containing a combination of physiologically compatible salts of (a) estrone sulfate and of (b) estradiol-3-sulfate shows a substantially stronger uterotropic effect than preparations containing respectively only one of the individual components. Whereas, for example, the conventional sodium salt (I) of estrone sulfate exhibits approximately ⅔, and the known sodium salt (II) of estradiol-3-sulfate has about ⅓ of the uterotropic effect of estrone, a mixture on a weight basis of 62% of I and 38% of II exhibited a uterotropic effect ranging approximately 90% above the effect of estrone.

| Substance: | Uterotropic effect (Estrone=1) |
|---|---|
| Estrone | 1 |
| I | 0.7 |
| II | 0.35 |
| Combination (62% of I+38% of II) | 1.9 |

This synergistic effect of I and II was completely unexpected. In addition, in the Allen-Doisy test (cornified stage of the vaginal epithelium), the combination of I and II was extraordinarily strong, being approximately 4.5 times that of estrone.

A similar effect was exhibited by combinations of I and II in other quantitative proportions, as well as combinations of I with other physiologically compatible salts of estradiol-3-sulfate, or of II with other physiologically compatible salts of estrone sulfate, or combinations of other physiologically compatible salts of estrone sulfate and of estradiol-3-sulfate with one another.

Examples for salts of estrone sulfate or estradiol-3-sulfate are predominantly the physiologically compatible alkali metal, alkaline earth metal, iron, aluminum, ammonium and substituted ammonium salts. Preferred salts are the sodium salts. Examples of other alkali metal salts are those of potassium, lithium, whereas examples of alkaline earth metals include calcium.

Substituted ammonium salts are especially those derived, for example, from the following amines: lower mono-, di- or trialkylamines wherein the alkyl group is of up to 4 carbon atoms, such as methylamine, dimethylamine, trimethylamine, ethylamine, di- and triethylamine, methylethylamine, etc.; mono-, di- or trialkanolamines wherein the alkanol group is of up to 4 carbon atoms, such as mono-, di- and triethanolamine; alkylenediamines of up to 6 carbon atoms, such as hexamethylenediamine; cyclic saturated or unsaturated bases of up to 6 carbon atoms, such as pyrrolidine, piperidine, morpholine, piperazine and the N-alkyl- and N-hydroxyalkyl-derivatives thereof, such as N-methyl morpholine, N-(2-hydroxyethyl)-piperidine, and furthermore pyridine. Also of importance are the corresponding quaternary salts, such as the tetra-alkyl salts (e.g. the tetramethyl salt), the alkylalkanol salts (e.g. the methyl triethanol salt, the trimethyl monoethanol salt), and the cyclic ammonium salts, e.g. the N-methyl pyridinium, N-methyl-N-(2-hydroxyethyl)-pyrrolidinium, N,N-dimethyl morpholinium, N - methyl-N-(2-hydroxyethyl)-morpholinium, N,N-dimethyl piperidinium and N-methyl-N-(2-hydroxyethyl)-piperidinium salts, which are distinguished by a particularly good water solubility. Basically, all ammonium salts can be employed which are physiologically compatible.

Synergistic proportions of the salts of estrone sulfate to the salts of estradiol-3-sulfate are to be employed, and a finite degree of synergism is to be expected in all proportions. Preferred, though, is the range of proportions of salt of estrone sulfate:salt of estradiol-3-sulfate which is 50:50 to 75:25, in particular the range of 60:40 to 65:35, respectively based on the weight of the sodium salts of both compounds.

Several of the above-mentioned salts of estrone sulfate or estradiol-3-sulfate are stable, especially several of the quaternary ammonium salts. When employing other salts, especially the sodium salts, however, it is recommended that suitable stabilizers be employed such as bases and basic-reacting salts, which, of course, must themselves be physiologically compatible. Examples for such stabilizers are: diethanolamine, N-methylglucosamine, sodium citrate, as well as buffer mixtures utilized for such purposes, e.g. "Sörensen buffer" a mixture of disodium hydrogen phosphate and potassium dihydrogen phosphate). The stabilization of the salts is suitably conducted before they are processed into the conventional pharmaceutical forms. In some cases, particularly when employing liquid stabilizers, it is advisable to utilize solid pulverulent carriers in addition. A particularly suitable solid pulverulent carrier is finely divided silicic acid. Magnesium oxide is also to be recommended since it is not only a solid carrier, but also it is a basic stabilizer.

This technique of utilizing a solid pulverulent carrier to absorb liquid stabilizers is believed to be novel. It can be applied to any system where it is necessary to stabilize a sensitive, pharmacologically active compound with a liquid stabilizer.

The metal and ammonium salts of estrone sulfate or estradiol-3-sulfate can be produced in conventional manner, f.e. by neutralizing a solution of the sulfuric ester of the steroid with the appropriate base. The quaternary salts can be made by reacting an ester, f.e. a lower alkyl ester, of estrone sulfate or estradiol sulfate, respectively, with the appropriate tertiary amine.

The composition of this invention containing the salts of estrone sulfate and estradiol-3-sulfate, as well as solid and/or liquid excipients, can be processed into the usual variety of pharmaceutical forms.

To produce these compositions, suitable carrier substances are those organic or inorganic compounds amenable to parenteral or enteral application, and which do not deleteriously react with the effective agents, such as, for example, water, polyethylene glycols, gelatine, lactose, amylose, magnesium stearate, or talc. For parenteral application, suitable, in particular, are solutions, preferably aqueous solutions, as well as suspensions or emulsions. For enteral application suitable are tablets, dragees, syrups and tonics which can, if desired, be sterilized or mixed with additives, such as preservatives, stabilizers or wetting agents, salts for influencing the osmotic pressure, buffers, coloring agents, flavoring substances and/or aromatic substances.

The total weight content of salts of estrone sulfate or estradiol-3-sulfate in the composition ranges preferably between 0.05 and 95%, depending on the type of application. Tablets contain preferably 0.1–10%; dragees 0.05–5%; injection solutions 0.05–1% of the salt mixture.

The composition is administered to mammals, especially females, in preferably unit dosage form containing, in total, between 0.1 and 10 mg. of the salts of estrone sulfate or estradiol-3-sulfate. Generally speaking, the composition can be employed in the same manner as the commercial product Premarin (a mixture of estrogens isolated from the urine of pregnant mares) for the same indications.

Premarin (Aeryst) is also known as Presomen and Equigyne in other countries (see: G. Heinen et al., Deutsche Medizinische Wochenschrift, 91 (35):1553–6, Sept. 2, 1966). These conjugated equine estrogens are described therein and also by Albrecht (Die pharmazie [pharmazeutische praxis] vol. 22, No. 5, 98–107 at p. 101, entry Konjugierte Ostrogene) relying on the Presomen (Kali-Chemie manufacturers product description). Albrecht, however, is erroneous with respect to naming the estradiol as a 17β-diol since the source Presomen reference, as well as Heinen correctly state the estradiol to be the 17α-form. The percentages of the various estrogens taken from Presomen are as follows:

15–30% Hydroxyestra-1,3,5(10),7-tetraene-17-one (Equilin)
40–60% Hydroxyestra-1,3,5(10)-triene-17-one (Estrone)
3–5% Estra-1,3,5(10)-triene-3,17α-diol (Etradiol)
up to 15% Hydroxyestra-1,3,5(10),6,8-pentaene-17-one (Equilenin) and Estra-1,3,5(10),6,8-pentaene 3,17α-diol and other α and β-estrogones (0.7%).

In Presomen dragees the conjugated estrogens are present as sodium-3-monosulfates.

In addition to these ester salts, additional active agents can optionally be added to the compositions, especially other steroids, e.g. other estrogens, androgens, gestagens, as well as vitamins and tranquilizers. A preferred gestagen (progestational agent) is chlormadinone acetate (6-chloro-6-dehydro-17α-acetoxy-progesterone); the unit dosage form of the compositions of this invention can optionally contain approximately between 0.5 and 10 mg. of this substance.

The compositions of this invention can always be employed when a deficiency of estrogenic hormones is to be overcome in the body, or when a supply of estrogens is desirable for other reasons. In particular, these compositions are suitable for the treatment of climacteric complaints (hot flashes, nervous lability, depressions) and secondary manifestations which easily occur during this period, such as osteoporosis. In contrast to a number of other estrogenic preparations on the market, the novel compositions of this invention can possess an accurate predetermined content of active agent.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

Tablets

Ten grams of estrogen sulfate (consisting of 62% sodium salt of estrone sulfate and 38% sodium salt of estradiol-3-sulfate) is dissolved in 100 ml. of methanol and 10 ml. of diethanolamine. The clear solution is poured on 20 g. of "Aerosil" (finely divided $SiO_2$), and the methanol is removed therefrom under reduced pressure. The thus-obtained powder is processed into tablets in such a manner that each tablet contains the following:

| | Mg. |
|---|---|
| Powder (produced as above) | [1] 4 |
| Lactose | 70 |
| Corn starch | 24 |
| Magnesium stearate | 2 |

[1] 1 mg. thereof being estrogen sulfate.

EXAMPLE 2

Dragees

Ten grams of estrogen sulfate is dissolved in 100 ml. of methanol and 10 ml. of diethanolamine. The clear solution is poured on 10 mg. of magnesium oxide, and the methanol is removed therefrom under reduced pressure. The thus-obtained powder is processed into dragees, in such a manner that each dragee contains the following:

| | Mg. |
|---|---|
| Powder (produced as above) | [1] 3 |
| Lactose | 80 |
| Potato starch | 15 |
| Talc | 2 |
| Dragee cover [coating] | [2] 150 |

[1] 1 mg. thereof being estrogen sulfate.
[2] =Mixture of sugar, corn starch, talc and tragacanth.

EXAMPLE 3

Injection solution

One kilogram of estrogen sulfate is dissolved in 10 liters of water. Five liters of a previously prepared 1/15-molar phosphate buffer according to Sörensen (=4.83 l. of 1/15-molar disodium hydrogen phosphate solution and 0.17 l. of 1/15-molar potassium dihydrogen phosphate solution; pH: 8) is added; the solution is filled up to 1,000 l. with water, and filled into 1 ml. ampoules. Each ampoule contains 1 mg. of active agent.

EXAMPLE 4

Tablets

Ten grams of estrogen sulfate is mixed, in a ball mill, with 10 g. of sodium citrate; 20 g. of "Aerosil" is added, and the resultant product is again mixed. The thus-obtained powder is processed into tablets, in such a manner that each tablet contains the following:

| | Mg. |
|---|---|
| Powder (produced as above) | [1] 2 |
| Lactose | 60 |
| Wheat starch | 40 |
| Arrowroot | 18 |
| Magnesium stearate | 2 |
| Talc | 8 |

[1] 0.5 mg. thereof being estrogen sulfate.

EXAMPLE 5

Syrup 0.02 kg. of estrogen sulfate is dissolved in 2 l. of distilled water, mixed with 0.1 l. of phosphate buffer (pH 8), then intermingled with 7 kg. of glycerin, 53 kg. of cane sugar, 0.1 kg. of a preservative (a mixture of the methyl ester of p-hydroxybenzoic acid and the n-propyl ester of p-hydroxybenzoic acid) and 12 l. of ethanol, and increased in volume to 100 l. by adding distilled water. An individual dosage (5 ml.) contains 1 mg. of active agent.

In place of the above-mentioned estrogen sulfate, it is possible to employ also other combinations containing at least one of each of the physiologically compatible salts of both estrone sulfate and of estradiol-3-sulfate in order to produce analogous or similar pharmaceutical forms of preparation.

EXAMPLE 6

Tablets

In a conventional manner, tablets having the following composition are manufactured:

| | Mg. |
|---|---|
| Powder (produced as in Example 1) | [1] 2 |
| Chlormadinone acetate | 2 |
| Lactose | 100 |
| Corn starch | 36 |
| Magnesium stearate | 2 |
| Finely divided silicic acid | 2 |
| Talc | 6 |

[1] 0.5 mg. thereof being estrogen sulfate.

The preceding examples can be repeated with similar success by substituting the generically or specifically described reactants and/or operating conditions of this invention for those used in the preceding examples.

In this specification, the term "estradiol-3-sulfate" stands for "3,17β-estradiol-3-sulfate" (the 3-mono sulfuric acid ester of 1,3,5(10)-estratriene-3,17β-diol).

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A unit dosage pharmaceutical composition suitable for the treatment of climacteric complaints and possessing an accurate predetermined constant of between 0.1 and 10 mg. in total per unit dosage of the combination of a salt of estrone sulfate and a salt of estradiol-3-sulfate as the essential active uterotropic agents, said unit dosage showing a substantially stronger uterotropic effect than that shown on an equivalent weight basis by the individual estrone component of a mixture of estrogens employed in the same manner for the same indications and isolated from the urine of pregnant mares, said unit dosage comprising synergistic proportions of a physiologically compatible salt of (a) estrone sulfate and a physiologically compatible salt of (b) estradiol-3-sulfate.

2. A composition as defined by claim 1 wherein both of said salts are sodium salts.

3. A composition as defined by claim 1 wherein said range is 60:40 to 65:35.

4. A composition as defined by claim 1, further comprising at least one tranquilizer or vitamin or at least one steroid selected from the group consisting of estrogens, androgens and gestagens.

5. A composition as defined by claim 1 further comprising chlormadinone acetate.

6. A process of treating female mammals during the climacteric period, which process comprises administering an effective dosage of a composition as defined by claim 1.

7. A process of treating female mammals during the climacteric period, which process comprises administering an effective dosage of a composition as defined by claim 12.

8. A process of treating female mammals during the climacteric period, which process comprises administering an effective dosage of a composition as defined by claim 16.

9. A process of treating female mammals during the climacteric period, which process comprises administering an effective dosage of a composition as defined by claim 6.

10. A pharmaceutical composition as defined by claim 1, wherein the ratio of (a) to (b) is about 62.38.

11. A process of treating female mammals during the climacteric period, which process comprises administering an effective dosage of a composition as defined by claim 10.

12. A composition as defined by claim 1, wherein the salts are unstable, said compositions being stabilized by and further comprising an effective stabilizing amount of a physiologically compatible liquid basic-acting stabilizer compound and a solid pulverulent carrier selected from the group consisting of silicic acid and magnesium oxide.

13. A composition as defined by claim 12, wherein both of said salts are sodium salts.

14. A composition as defined by claim 12, wherein said carrier is silicic acid.

15. A composition as defined by claim 14, wherein said carrier is magnesium oxide.

16. A composition as defined by claim 1, wherein said unit dosage pharmaceutical composition is a tablet, dragee, injection solution or syrup.

References Cited

UNITED STATES PATENTS

| | | | |
|---|---|---|---|
| 2,429,398 | 10/1947 | Cook et al. | 424—100 |
| 2,534,121 | 12/1950 | Grant et al. | 260—397.4 |
| 2,551,205 | 5/1951 | Cook et al. | 424—100 |
| 2,696,265 | 12/1954 | Beall et al. | 424—100 |
| 2,711,988 | 6/1955 | Deans et al. | 424—100 |
| 2,834,712 | 5/1958 | Beall et al. | 424—100 |
| 3,231,470 | 6/1966 | Zbinden | 424—100 |
| 3,487,152 | 12/1969 | Carstensen et al. | 424—240 |

OTHER REFERENCES

Wilson et al. "ADI–1965" American Drug Index, 1965 pp. 263–268 pub. 1965, J. B. Lippincott Co., Phila., Pa.

G. Heinen et al. Deutsche Medizinische Wochenschrift 91(35): 1953–6 Sept. 2, 1966.

Albrecht, I. H. Die Pharmazie (Pharmazeutische Praxis) 22(5):98–107 (1967).

Gaudry, R. et al. Compte Renov du XXXI Congress International de Chemie Industrielle Liege September 1958, Imprimerie Mercuries Anvers pp. 1–5 "Sur la Fraction Steroide de L'Urine de Jument Gravide."

SHEP K. ROSE, Primary Examiner

U.S. Cl. X.R.

424—100, 238, 240, 243